INFORMATION HANDLING APPARATUS

Filed July 13, 1965 2 Sheets-Sheet 1

INVENTORS
PREM SHIVDASANI
DAVID D. DeVOY
BY Robert J. Zinn
ATTORNEY

| | B01 | B02 | B03 | B04 | B05 | B06 | B07 | B08 | B09 | B10 | B11 | B12 |
|---|---|---|---|---|---|---|---|---|---|---|---|---|
| T1 | 1 | 2 | 3 | 4 | 17 | 18 | 19 | 20 | 33 | 34 | 35 | 36 |
| T2 | 5 | 6 | 7 | 8 | 21 | 22 | 23 | 24 | 37 | 38 | 39 | 40 |
| T3 | 9 | 10 | 11 | 12 | 25 | 26 | 27 | 28 | 41 | 42 | 43 | 44 |
| T4 | 13 | 14 | 15 | 16 | 29 | 30 | 31 | 32 | 45 | 46 | 47 | 48 |
Fig. 2A
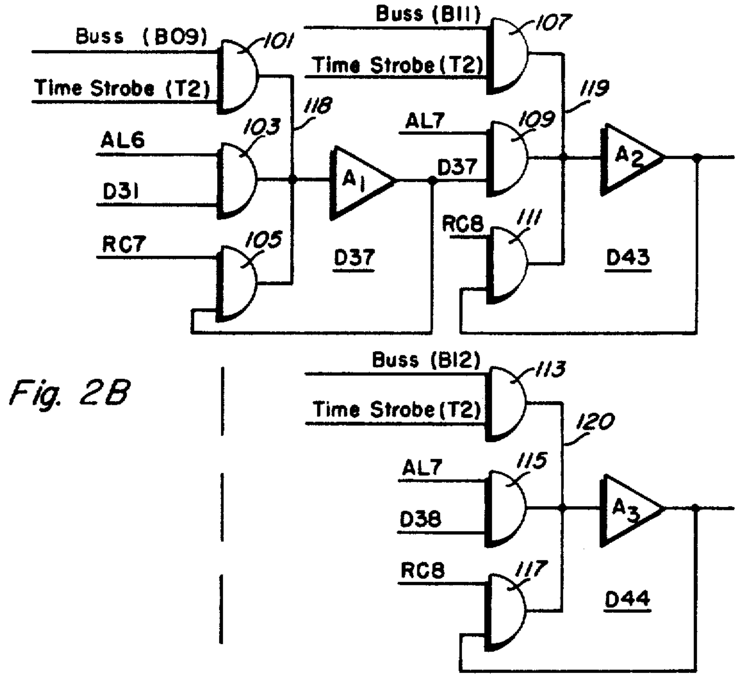
Fig. 2B
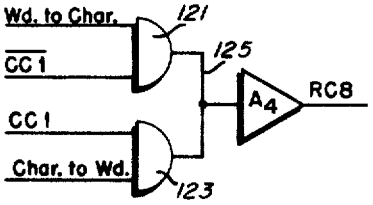
Fig. 2C
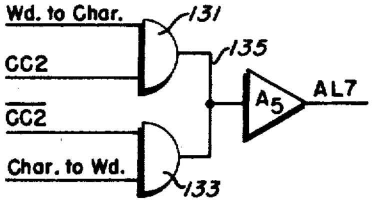
Fig. 2D
INVENTORS
PREM SHIVDASANI
DAVID D. DeVOY
BY Robert J. Zinn
ATTORNEY United States Patent Office 3,388,383

Patented June 11, 1968

3,388,383

INFORMATION HANDLING APPARATUS

Prem Shivdasani, Newton, and David D. De Voy, Dedham, Mass., assignors to Honeywell Inc., Minneapolis, Minn., a corporation of Delaware Filed July 13, 1965, Ser. No. 471,671
9 Claims. (Cl. 340—172.5)

ABSTRACT OF THE DISCLOSURE

An asynchronous transfer apparatus comprising a plurality of multistage register banks, each stage of which is provided with recirculation and transfer logic, and having control means including a novel shift register operatively connected thereto whereby information may be transferred essentially simultaneously from the respective stages of any particular register bank to the output of the transfer apparatus.

Apparatus for the conversion of coded information from a first format into a second format are well known. Such apparatus may consist, for example, of a number of flip-flop stages connected in chain formation through associated transfer stages. A shift pulse applied to all the transfer stages simultaneously causes the setting of each flip-flop to be transferred to a higher order flip-flop in the chain. Information may be selectively entered into the various flip-flop stages of the conversion apparatus and thereafter transferred out simultaneously from the higher order stages. The implementation of such systems may be prohibitively expensive because of the number of synchronous flip-flops required to effect the implementation thereof. The synchronous nature of such systems further necessitates additional circuitry to enable the gating of the time-oriented synchronous flip-flops.

An alternative approach is to utilize asynchronous set-reset logic in the implementation of the data transfer device. A conventional approach to the implementation of such a system, i.e. using asynchronous set-reset logic, may be discouraged because of "race problems" associated with the asynchronous logic. In the past it has been necessary to provide some means of preventing the "race problem" in which a bistable device of a given stage reacts to a given input signal prior to the cessation of the application of an output signal to the next succeeding stage. Thus, in order to effect a transfer from one stage to the next higher stage, additional storage means are sometimes provided into which the information to be transferred is temporarily stored pending the resetting of the register stages into which the information is to be moved. It becomes obvious that a conventional approach to an asynchronously implemented data transfer apparatus may be equally unrealistic because of the duplication of hardware necessary to effect the interstage transfers.

Accordingly, it is a primary object of the present invention to provide a data transfer apparatus capable of effecting the transfer of information in a first format into information of a second format without requiring the expenditure of expensive or duplicated circuitry.

It is a further more specific object of the present invention to provide an improved information transfer apparatus adapted to receive information in the form of multi-bit words in either a serial-parallel or parallel manner and to transform the information into a character format.

It is a further object of this invention to provide, in an information transfer apparatus, an asynchronously operative apparatus which enables digital information to be conveniently transferred without necessitating the expenditure of duplicated hardware or operating time.

It is still another object of the present invention to provide an asynchronous data transfer device in which information in a first format is selectively entered into a plurality of multi-stage register banks and temporarily stored therein by means of recirculation logic whereafter the contents of the multi-stage register banks are transferred directly to an output register upon successive requests generated within the accepting device.

Another more specific feature of the present invention concerns an asynchronous data transfer device including a plurality of multi-stage register banks, each stage of which is provided with recirculation logic to conveniently preserve information entered therein and transfer logic which when conditioned enables the direct transfer of information stored therein, through adjacent stages, and to the output register of the transfer device.

A further object of the present invention is to provide in a data processing apparatus novel control circuitry to effect the generation of signals for controlling the transfer of information therein.

Still another object of the present invention is to provide, in an asynchronously implemented apparatus, control circuitry including a shift register having associated therewith gating circuitry, which control circuitry is further characterized by its ability to be conveniently reset in response to a strobing pulse of short duration.

Another feature of the present invention concerns the provision in a data transfer apparatus, of control circuitry for asynchronously generating, during successive operative cycles, pulse trains having a predetermined number of pulses therein.

It is still a further object of this invention to provide an improved data transfer apparatus characterized by its efficiency, its flexibility and its economy of construction.

These and other objects are attained in a specific and illustrative embodiment of the invention in which a plurality of multi-stage register banks are provided. In accordance with a preferred embodiment of the present invention, the plural register stages are implemented with asynchronous set-reset logic capable of defining two stable states of operation. Such asynchronous set-reset logic is further characterized by its simplicity of construction in that an operative embodiment may comprise first and second AND gates buffered to the input of an associated amplifier. Accordingly, upon satisfaction of the input conditions to the first AND gate, the amplifier becomes operatively conditioned so that the output therefrom may in turn be recirculated through the second AND gate and from thence back to the input of the amplifier. Thus, once conduction is initiated in the amplifier, it remains in this state until the feedback current in the recirculation path is terminated. A convenient manner of terminating the recirculation current is to insert a conditioning lead to the gating structure in the recirculation path whereby the conditioning of this latter gate is completed by a signal selectively generated to maintain the active status of its associated amplifier.

In the preferred embodiment of the present invention, the conditioning logic enabling the initial activation of each asynchronous set-reset stage is by way of either of two buffered input gates. Conditioning signals to the first of these represent information in a first format to be transformed at its output to information in a second format. Similarly, input signals to the second conditioning gate represent signals advanced thereto from the corresponding stage of the immediately preceding bank of stages. The conditioning of this latter gating structure is completed by a signal which permits the information to be advanced from the preceding stage only at predetermined times.

A particular feature of the present invention concerns the manner in which the information is transferred through the plurality of multi-stage register banks. in this respect, the transfer logic between corresponding stages of adjacent register banks is such that when the transfer conditions have been established between all corresponding stages intermediate a particular bank of stages and an output bus, an indication of the contents of the respective stages will ripple through to the output without experiencing any delay in the intermediate stages. The ability to effect the above-outlined operation is further dependent upon the synchronizing of signals directed to the recirculation gating circuitry with those directed to the transfer circuitry. Thus, to initiate the transfer of the contents of some intermediate bank of stages to the output bus, the transfer logic interconnecting the corresponding positions of those banks positioned between the selected stages and the output bus are conditioned, as has been indicated above; while in addition, the conditioning signals to the corresponding recirculation gates are removed.

It is another feature of the present invention to provide special control signal generating means adapted to generate the transfer and recirculation signals directed to the respective multi-stage register banks. The signal generator comprises a multi-stage shift register having gating circuitry associated with the input and output thereof such that as a stream of input signals of a first binary significance is gated through successive stages to the last stage of the shift register, the output therefrom is returned as an input to the first stage of the shift register to effect the insertion of a new series of signals of different binary significance from those previously inserted. As the leading pulse in this new series of signals is transferred out of the last stage of the shift register, a signal is again returned to the input of the first stage of the shift register to effect the insertion of another series of pulses corresponding to those of the first binary significance.

Although the overall operation of the shift register follows in accordance with the manner of operation outlined above, the asynchronous nature of the present invention makes indefinite the time of transition of any particular stage from one of its bistable conditions to the other. More specifically, since the transfer of states within the shift register is a function of the demands generated (on a character basis) within the character receiving and transferring apparatus, the signals initiating the shifts will occur randomly with respect to absolute time.

As the leading pulse of a series of pulses of particular binary significance advances into the last stage of the shift register, gating means are conditioned to indicate this status. The detection of this condition indicates that the loading or unloading of the plurality of multi-stage register banks has been completed. This in turn initiates further control operations to either complete the transfer or ready the transfer apparatus for a new transfer operation.

Additional gating circuitry is associated with the outputs from the individual stages of the shift register. This gating circuitry is responsive to signals indicating the transition of the associated register stage in response to a signal of either binary significance. The insertion of this latter gating circuitry enables the output signals therefrom to be used in a manner which makes them independent of the source or nature of the transition initiating signals. More specifically, as viewed by the recirculation logic and transfer logic coupling the respective register banks and shift register stages, the output signals directed thereto in response to any transition within the associated shift register stage, are indistinguishable.

This same gating circuitry is effective in resetting the control signal generator in that one of the conditioning signals to the gating structure interconnecting the outputs of the respective shift register stages to the recirculation and transfer logic is terminated somewhat automatically as a transition occurs in the last stage of the shift register.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

In the drawings:

FIGURE 2 represents a time-oriented tabulation of the manner in which information is transferred into respective stages of the apparatus disclosed in FIGURE 1;

FIGURE 2B is a detailed representation of the logic associated with several of the register stages of FIGURE 1;

FIGURE 2C is a detailed representation of the logic associated with a conditioning lead disclosed in FIGURE 2B; and FIGURE 2D is a detailed representation of the logic associated with another one of the conditioning leads to the logic of FIGURE 2B.

Figure 1:
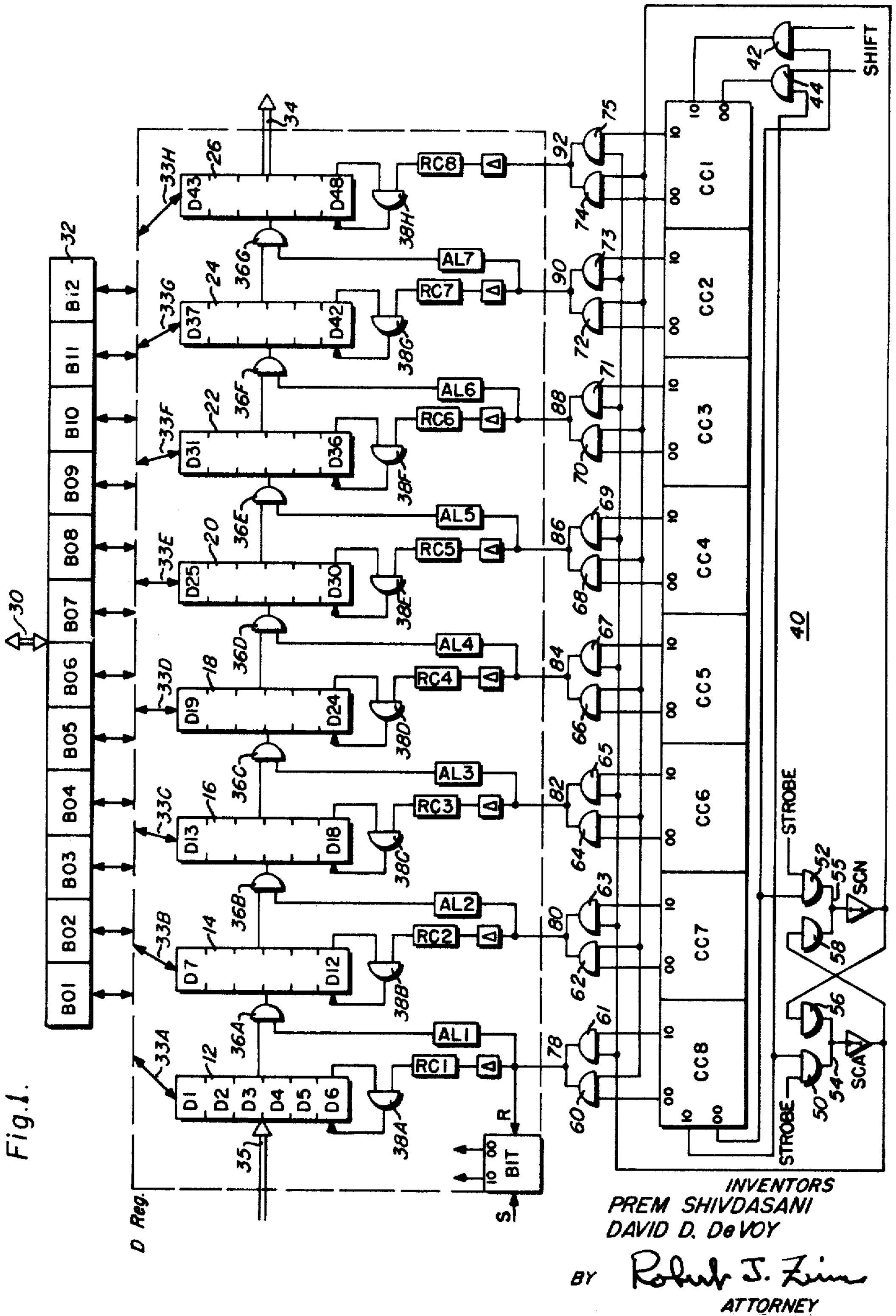
FIGURE 1 is a block diagram representation of a data transfer device constructed in accordance with the principles of the present invention.

Referring now to FIGURE 1, therein is disclosed a plurality of multi-stage register banks 12–26 which, along with associated gating circuitry enclosed within the dotted lines, are referred to generally as the D register. The multiple stages of each bank comprise asynchronously implemented set-reset bistable devices of a conventional design. As indicated in FIGURE 1, there are six register stages per bank with a total of 48 stages corresponding to a 48 bit data word for which this particular embodiment was designed. The logical construction of the respective register stages will be examined more completely in relation to the circuitry of FIGURE 2B as discussed below; however, it should be noted with respect to FIGURE 1 that the multiple stages D1 through D6 of the first register bank 12 are independently implemented both with respect to loading transfer and recirculation logic. The stages constituting any particular bank do share in common the recirculation and transfer function signal sources; however, as regards loading and information content, the respective stages of a particular bank are independent.

The actual loading of information into the respective stages of the register banks 12–26 is selectively effected in a manner to be disclosed more fully with respect to the interpretation of the table of FIGURE 2A in terms of the logical circuitry of FIGURE 2B. It may be noted, however, with respect to FIGURE 1, that information is transferred between the transfer apparatus and a word oriented source, not shown via a bus 30. Thus information entering the transfer apparatus from the word oriented source on bus 30 is selectively gated through 12 transfer channels of a member 32. The latter may comprise gating structure to modify the signal level of the incoming signals from those common to the word oriented device so as to make them compatible with those used in the character receiving device. In case no signal level conversion is required, member 32 may be logically organized to selectively transfer the information signals to and from respective stages of the D register during predetermined time frames. From the gating structure 32, the information enters predetermined stages of the multiregister banks via input-output lines indicated generally herein as members 33A–H.

Also shown in a general manner is the transfer logic 36A–G and recirculation logic 38A–H. Although the input-output lines 33A–H, the transfer logic 36A–G, and the recirculation logic 38A–H have been indicated as being connected generally to respective register banks, in actuality each stage of the transfer apparatus of FIGURE 1 has equivalent transfer logic independently associated therewith. Information is transferred to the character oriented device via a bus 34 and is inputed to the transfer apparatus of FIGURE 1 via a bus 35.

Also disclosed in FIGURE 1 is a control circuit indicated generally as member 40 for generating the transfer and recirculation function signals. Member 40 consists of a multi-stage shift register comprising stages CC1 through CC8 and having feedback means associated with the output of stage CC8, which in turn forms an input to stage CC1. Stages CC1 through CC8 function in a manner characteristic of a shift register in that each stage is capable of assuming one or the other of two bistable states in accordance with the nature of an input signal and for generating a corresponding output signal in response thereto. In accordance with the terminology adopted herein, the assertion state of stages CC1 through CC8 of shift register 40, indicative of the "set" condition of a particular register stage, is indicated as "10"; while the negation state, indicative of the "reset" condition, is indicated as "00." The "set" condition is in turn established by a "1" shifted thereto from the preceding stage, or in the case of stage CC1, gated thereto from AND gates 42 and 44.

During successive time cycles, the operative condition of a particular shift register stage is advanced to the next succeeding stage while the information in that stage is in turn advanced to its succeeding stage. Because of the particular manner of effecting the feedback from the output of the last stage of the shift register to the input of the first stage; namely, by taking the output from one side of stage CC8 and connecting it as an input to the other side of stage CC1, member 40 is effective in generating a string of eight pulses of one type followed by eight pulses of the other type and then repeating with eight more pulses of the first type. The transfer from stage to stage is effected in accordance with shift pulses shown as being "Anded" together in gates 42 and 44 to form inputs to stage CC1. As will become apparent from an explanation of the operation of the transfer apparatus of FIGURE 1, the shift signal is in timed relationship to the transfer of information to and from the character device.

A particular feature of interest of the shift register 40 concerns the manner in which it is reset. In this respect, at the output of the CC8 stage, there is included gating circuitry which may take the form of a logical flip-flop conditioned by either of the outputs of the CC8 stage to thereby effectively reset the counter with one relatively short stroke pulse. The utilization of the output signals from the last stage of the counter to automatically effect the resetting of all stages thereof eliminates the need of a special reset input and associated shift pulses of greater than normal duration.

Included in the reset logic of member 40 are AND gates 50 and 52 having conditioning leads connected thereto which respectively represent the set and reset condition of stage CC8. The conditioning of AND gates 50 and 52 is completed by strobe signals which originate in a timing source not shown. The stroke signals are generated once each operative cycle of the counter, that is, as the condition of stage CC8 switches from its set to its reset state (or vice versa), a strobing signal of short duration is applied to AND gates 50 and 52. The outputs of AND gates 50 and 52 are buffered into inverters SCA and SCN respectively. Feedback paths from the output of the inverters SCA and SCN cross-couple the output of each inverter to form an input to the other by way of gating devices 56 and 58. In accordane with a conventional logical implementation, the recirculation path associated with the outputs of inverters SCA and SCN are used to lock up the logical flop in one or the other of its operative states. Thus, as stage CC8 assumes its "set" condition by responding to the transfer of a "1" thereto from the preceding stage CC7, the assertion output "10" from stage CC8 goes high to partially condition AND gate 50. The arrival of the stroke signal completes the conditioning of AND gate 50, the output of which is in turn buffered through an OR gate 54 and into the inverter SCA. As the input to the inverter SCA goes high, the output therefrom goes to ground. This ground signal is cross-coupled to form the input to gating device 58. This maintains the input to inverter SCN at ground potential to insure that the output of the inverter SCN is high. The output of the inverter SCN is in turn cross-coupled to the input of gating device 56 so as to maintain the input to inverter SCA high and the output thereof at ground, after the strobe signal has been removed.

The output signals from inverters SCA and SCN are used to condition AND gates 60 through 75 which in turn are used to energize the transfer and recirculation logic of the D register. It may be noted that the AND gates 60 through 75 are paired in relation to the respective stages of the shift register 40. The assertion and negation outputs of each of these stages thus form the inputs to complete the conditioning of the paired AND gates associated therewith. The outputs of the paired AND gates are in turn buffered through OR gates 78–92 to form a source of signals to the control logic associated with each bank of register stages comprising the D register. In addition, connected to the output of OR gate 78, is the reset line of a conventional bistable device BIT.

The function of member 40 in serving as a signal generator will become apparent from a complete explanation of the operation of the circuitry of FIGURE 1 which will follow the introduction and discussion of the control logic of FIGURES 2B, C and D. FIGURE 2B discloses a portion of the D register of FIGURE 1, and in particular shows stage D37 of bank 24 of the D register as being coupled to the input of stage D43 of bank 26. Also disclosed in somewhat independent relationship is stage D44 of bank 26 of the D register. Stage D43 is shown as being comprised of an amplifier $A_2$ having buffered thereto, through OR gate 119, conditioning inputs representing the outputs of three AND gates 107, 109 and 111. The conditioning of AND gate 107 is effected in accordance with the time-oriented tabulation of information appearing in FIGURE 2A.

As has been indicated above, input information is transferred from the word oriented data source via bus 30 into gating logic 32 and from thence distributed via the input-output lines 33 to the respective stages of the D register. Thus, as indicated in FIGURE 2A, at time $T_3$ on bus B11, a signal may be transferred to stage D43. Because of the nature of the asynchronous logic, a particular stage will be "set" only when all conditions are satisfied. As such, the logic may be said to be looking for "1's." This manner of implementation is particularly important to the operation of the D register and the transfer and recirculation logic associated therewith, as will become apparent from the explanation of the operation of FIGURE 1 which follows below. Thus, if at time $T_3$ a signal is carried on bus B11, the conditioning of AND gate 107 will be satisfied and the amplifier $A_2$ will be actuated. The output of the amplifier $A_2$ is fed back as a conditioning input to AND gate 111 which in combination with a recirculation signal RC8 will lock stage D43 in its operative state. The recirculation signal RC8 is generated in accordance with the logic disclosed in FIGURE 2C.

Turning momentarily to FIGURE 2C, therein is disclosed a pair of AND gates 121 and 123 buffered through member 125 to the input of an amplifier $A_4$. The conditioning of AND gate 121 is satisfied whenever a word to character transfer is to be performed and the status of the associated counter stage, in this instance stage CC1, is one of negation. This latter condition is taken with respect to the output of OR gate 92 and implies that a new transfer cycle has been initiated but that the particular shift register stage involved (stage CC1 in this instance) has not experienced a transition. Similarly, in a character to word transfer, a signal indicative of this type of transfer operation is combined in AND gate 123 with a signal establishing the assertion output of stage CC1, that is, that a transition has occurred in stage CC1. The exact function and opeative nature of the RC8 signal will become more readily apparent from an explanation of the operation of the embodiment of the present invention disclosed in FIGURE 1.

Returning now to FIGURE 2B, it may be noted that the conditioning of AND gate 109 of stage 43 of the D register is effective in forwarding the operative status of the preceding stage (D37) thereto. The conditioning of AND gate 109 is completed by a signal AL7 which is generated in the logical circuitry of FIGURE 2D. The signal AL7 is generated in response to the activation of an amplifier $A_6$, the energization of which is in turn established upon satisfaction of the input conditions to either of two AND gates 131 or 133 buffered to the input of the amplifier $A_6$ through OR gate 135. AND gate 131 is conditioned upon the combination of an input signal indicating that a word to character transfer is in progress in combination with a signal establishing that a transition has occurred in the associated shift register stage. In this instance, the latter condition is established by an assertion output from counter stage CC2. Similarly, AND gate 133 is conditioned by a signal establishing a character to word transfer in combination with a signal establishing that a transition has not yet occurred in the CC2 stage of the shift register 40.

Before proceeding to an explanation of the operation of the entire system, consideration is directed to that portion of FIGURE 1 which discloses the bistable device BIT having set and reset inputs which are selectively pulsed to establish the operative status of the transfer apparatus. More specifically, the BIT flop is set by a signal from the word receptive member requesting that a word be forwarded thereto from the character formulating device. The setting of the BIT flop generates a signal in the character formulating member which in turn initiates a transfer of eight successive characters into the storage locations of the D register. The transfer of each character to the D register occurs at an asynchronous rate established in accordance with the transfer capabilities of the character formulating device. Accordingly, the shift signals which form the partial conditioning inputs to AND gates 42 and 44 are generated by the character formulating device as it prepares to transfer a character to the input bus 35 of the D register. A transition within the CC8 stage, occurring upon receipt in the shift register 40 of the eighth shift pulse, indicates that the D register has been filled. This signal in turn resets the BIT flop and a signal, indicating the status of the D register as being filled and awaiting transfer to the word receptive member, is returned to the word requesting unit which thereafter initiates a transfer of the contents of the D register thereto.

In a similar manner, a word to character transfer is initiated by the loading of bits from the input-output lines leading to the D register from the word formulating device. This information enters the respective stages of the D register in the manner illustrated in FIGURE 2*a*. Thus, in the preferred embodiment, the loading is effected in a parallel-serial manner in which four items consisting of 12 bits each is selectively transferred into the various stages of the D register. After the fourth item has been transferred, a signal is generated which sets the BIT flop thus indicating the readiness of the transfer apparatus to communicate with the character accepting member.

In considering a detailed explanation of the operation of the circuitry of FIGURE 1, assume first that a word to character transfer is to be effected. Accordingly, information enters the respective stages of the D register in accordance with the schedule outlined in the table of FIGURE 2A. Thus, during time $T_1$, the first item of information enters the gating structure 32 and is transferred therefrom via lines 33 to respective locations in the D register. As indicated in the table of FIGURE 2A, during time $T_1$, the information in portion BO1 of the gating structure 32 is directed to stage D1 of the D register. During time $T_2$, the information in portion BO1 of the gating structure 32 is directed to stage D5 of the D register. Similarly, during time $T_3$, the information in portion BO1 is directed to stage D9 and during time $T_4$, the information therein is directed to stage D13. Time $T_1$ through $T_4$, as herein referred to, is to be taken with respect to the word formulating device and is not to be confused with shift pulses generated in the character formulating and receiving device or the strobe signals associated with AND gates 50 and 52. It should be readily apparent that although the information to be transferred enters the D register in a serial-parallel basis, the D register may be implemented to accept the information completely in parallel. This manner of loading would be implemented by expanding the transfer bus 30 and the input-output lines 33 to simultaneously accommodate the total number of bits in the data word.

In the present embodiment, the generation of the timing signal $T_4$, in addition to effecting the completion of the transfer of information to the D register, also initiates the generation of a signal to set the BIT flop thus indicating that the transfer apparatus is loaded and ready to transfer information to the character receptive device. At this point in the execution of the transfer operation, it may be assumed that all stages of the shift register 40 are in their reset state. Thus, stages CC1 through CC8 may be assumed to have their negation outputs high. Accordingly, the negation output from stage CC8 is at this time partially conditioning AND gate 42. The setting of the BIT flip-flop after the loading of the D register initiates the generation of a signal to the character receptive device which in turn activates the source of shift pulses to complete the conditioning of AND gate 42. This leads to the introduction of a "1" into stage CC1 of member 40 and consequently this stage assumes an assertion output.

Just prior to the insertion of the "1" into stage CC1, the condition of the gating structure interconnecting the respective stages of the shift register 40 and the associated banks of the D register is such that all recirculation functions are active while the transfer logic is inhibited. Thus in addition to initiating the source of shift signals from the character receptive device, the setting of the BIT flop also initiates the transfer of the information in the register stages constituting bank 26 to the input portion of the character acceptive device via the transfer bus 34. In accordance with the asynchronous nature of the transfer apparatus, the actual transfer to the character receptive device is made in accordance with demands as generated therein.

Assume now that a "1" has been transferred into stage CC1 of the shift register 40. As this occurs, an assertion signal is gated therefrom which combines with the output signal from the inverter SCA to complete the conditioning of AND gate 75. This in turn initiates the transfer of a signal through OR gate 92 which is transferred through a delay member Δ whereafter it arrives at the gating circuitry RC8. In accordance with the gating logic of FIGURE 2C, the gating conditions to the recirculation amplifier $A_4$ are no longer satisfied and the recirculation signal RC8 goes to ground. Accordingly, at this time the conditioning of AND gate 111 associated with stage D43 of FIGURE 2B is no longer satisfied and the information contents thereof drop to zero. In like manner, the recirculation in all stages of bank 26 cease and the contents of these stages also go to zero.

Upon the arrival of the next shift signal to the inputs of AND gates 50 and 52, the former is again conditioned and another "1" is transferred into stage CC1. Simultaneously, the "1" previously stored in stage CC1 is advanced to stage CC2. The latter stage, upon experiencing a transition, generates an output signal to complete the conditioning of AND gate 73. The signal generated at the output of AND gate 73 is in turn buffered through OR gate 90 to form an input to the transfer logic interconnecting register banks 24 and 26. At this time the gating conditions requisite to the generation of the AL7 signal, as indicated in FIGURE 2D, are satisfied. Accordingly, each stage of bank 24 of the D register in which a "1" state is stored is advanced through the corresponding stage of the register bank 26 momentarily activating the amplifier therein. There thus appears on the output bus 34 somewhat simultaneous with the transfer signal AL7, a set of signals indicative of the contents of stages D37 through D42 for transfer to the character receptive device.

In addition to activating the transfer function AL7, the signal from the OR gate 90 also enters a delay element Δ designed to delay the cessation of the recirculation function RC7 sufficiently to assure that the transfer of the contents of bank 24 through bank 26 has been completed before the recirculation signal is terminated. The delay members may actually comprise physical delay circuits of conventional design or the operating characteristics of the transfer circuits and their relationship to the shift signals and information signals may be such as to insure the order of operations outlined above.

As a signal is transferred from the output of the delay member indicating that a transition has occurred in stage CC2, the conditioning of the equivalent of AND gate 121 of FIGURE 2C is no longer satisfied and the output of the equivalent of amplifier $A_4$ goes to ground. Accordingly, signal RC7 conditioning AND gate 105 of FIGURE 2B is removed and the recirculation in this and the other stages of bank 24 ceases.

As the shift signals are generated in the character receptive member associated with the output bus 34, they are transferred to AND gates 42 and 44 connected as inputs to stage CC1. Accordingly, with each input pulse, the assertion condition continues to shift from stage CC1 through CC2 and thence to stages CC3, CC4 etc. In a similar manner, the transition accompanying the introduction of the assertion condition into each successive stage results in the enabling of the transfer logic and a short time thereafter in the cessation of the signals in the recirculation logic. Thus, as stage CC3 switches to the assertion condition, the transfer signal AL5 goes high and momentarily thereafter the recirculation signal RC6 goes low. Since the recirculation signals associated with banks 24 and 26 are already low and the transfer signals associated with the gating structure positioned between 22 and 24, and 24 and 26 respectively are high, the initiation of the transfer of the information in the D register locations 25 through 30 of bank 20 is effected with the information therein flowing directly through corresponding stages in banks 22, 24 and 26 to bus 34 connected to the input portion of the character receiving device.

The operation continues in this manner in response to successive shift signals directed to the input of gating device 42, until the assertion condition arrives at stage CC8. Here, in addition to enabling the transfer logic 36A and inhibiting the recirculation logic 38A associated with the respective stages of bank 12, a signal is sent to the BIT flop to effect the resetting thereof thus indicating the completion of the word to character transfer. This signal is sensed by the word formulating member associated with the bus 30 to indicate the completion of the transfer and the readiness of the transfer apparatus to initiate a new operative cycle. At this same time, the line connecting the assertion output of stage CC8 to the input of AND gate 50 is conditioned so that upon receipt of a subsequent strobe signal from the word formulating member acknowledging receipt of the end of transfer signal from the BIT flop, an output signal will be transferred from AND gate 50 which when buffered through member 54 drives the output of the inverter SCA to ground. The output signal from the inverter SCA and the signal indicating that assertion condition is presently established in each of the stages CC1 through CC8 now no longer satisfy their respective odd numbered AND gates 61–75. Accordingly, the output of the buffers 78 through 92 also go to ground.

With the inputs to AND gates 52 and 58 at ground, the output of the inverter SCN will be high. This conditions one line of the even numbered AND gates 60 through 74, so that the activation of the shift signal source by a subsequent word to character or character to word transfer order will initiate the gating of signals therefrom in the same manner as noted above with respect to the insertion of the string of "1's" into the gating structure; however, this time the transition within the successive stages CC1 through CC8 will occur in response to the insertion of a string of zeros as output signals from AND gate 44.

When the word to character transfer has been completed, and it is desired to effect a character to word transfer, the circuitry of FIGURE 1 is conditioned in a similar manner. Assuming that an order is processed to effect a character to word transfer, a signal is first transferred to the BIT flop to place it in its "set" state. At the same time, a signal is generated initiating the transfer of a shift signal to the inputs of AND gates 42 and 44. Assume further that stages CC1 through CC8 all register an assertion condition so that the assertion output "10" of stage CC8 is at present conditioning AND gate 44; thus the appearance of the shift signal will shift stage CC1 to its negation state. The combination of the negation signal "00" and the signal from the inverter SCN will condition AND gate 74 so that an output signal will be gated through the buffer 92.

Just prior to the time the output of AND gate 74 is buffered through member 92, the recirculation logic associated with each stage of the D register is inactive while the transfer logic between corresponding stages of the various banks is energized. This status agrees with the conditioning requirements to gates 123 and 133 of FIGURES 2C and 2D respectively. Thus at this time the transfer stage CC1 assumes its negation state "00" and the output of AND gate 74 goes high, the recirculation logic RC8 becomes active. At the same time the first character of information from the character formulating device arrives on the bus 35 and is transferred through the various D register bank until it arrives at bank 26 where it is stored in the respective D register stages.

As the next shift pulse arrives at the input of AND gate 44, the negation condition "00" is advanced from counter stage CC1 to stage CC2. Accordingly, AND gate 72 is conditioned and the signal at the output of OR gate 90 results in the deactivation of the transfer logic between banks 24 and 26 of the D register, and shortly thereafter the recirculation logic associated with bank 24 is activated. Meanwhile recirculation continues in bank 26. This last shift pulse also initiates the transfer from the character formulating device of the second character of information via the input bus 35. Since the recirculation logic 38A, B, C, D, E and F is all down and the transfer logic 36A, B, C, D, E and F is high, the information is transferred directly from the input bus 35 to the respective stages of the bank 24 wherein it is retained by means of the recirculation logic.

In this manner, the characters to be transferred are loaded in successive banks of the D register until the D register is filled. At this time, the negation condition "00" has advanced to stage CC8 and a reset pulse is transferred to the BIT flop. The resetting of the BIT flop indicates to the word accepting member that the D register is now filled and the completion of transfer to the word receptive device may be completed. This latter portion of the transfer may be completed via the gating circuitry 32 and bus 30 in the manner indicated above with respect to the loading of the D register during the word to character transfer. Although the transfer to and from the D register has been explained in terms of a complete 48 bit word, it is also possible to implement the transfer apparatus to enable the transfer and format conversion of any number of bits or characters.

It will be apparent from the consideration of the foregoing specification that there has been illustrated and described a new and improved apparatus useful in effecting the conversion of input information in a first format into output information in a second format such as may be encountered in transfer operations associated with an electronic data processing system. While in accordance with the provisions of the statutes, there has been illustrated and described the best forms of the invention known, it will be apparent to those skilled in the art that changes may be made in the apparatus described without departing from the spirit of the invention, as set forth in the appended claims, and that, in some cases, certain features of the invention may be used to advantage without a corresponding use of other features.

Having now described the invention, what is claimed as new and novel and for which it is desired to secure the Letters Patent is:

1. In an information transfer apparatus the combination comprising a plurality of multi-stage register banks, each stage of which comprises gating means including input means, transfer means and recirculation means operatively connected therewith; said input means having information signals selectively applied thereto to condition its associated stage to a particular operative state; said recirculation means having control signals selectively applied thereto to maintain its associated stage in said particular operative state; said transfer means interconnecting corresponding stages of said plurality of multi-stage register banks, said transfer means having control signals selectively applied thereto to enable the transfer through its associated stage of a signal indicative of the operative state of another stage of another one of said plurality of multi-stage register banks; and control means for generating said control signals, said control means being connected to said transfer means and said recirculation means associated with each of said stages whereby a signal indicative of the operative state of any particular stage may be transferred essentially simultaneously through any number of stages.

2. In a data transfer apparatus the combination comprising a plurality of multi-stage register banks, each of said stages having data input means operatively connected therewith, said data input means further comprising gating means including at least two selectively actuated sources capable of collectively energizing the associated stage to an operative condition indicative of a predetermined binary state, recirculation means coupled to each of said stages, means selectively conditioning said recirculation means to thereby maintain its associated stage in said predetermined operative condition, transfer means interconnecting corresponding stages of said plurality of multi-stage register banks, and control means connected to said transfer means and said recirculation means to selectively energize said latter two means whereby information may be transferred essentially simultaneously from the respective stages of any particular register bank to the output of said transfer apparatus.

3. In a data transfer apparatus the combination of a plurality of multi-stage register banks, each of said stages comprising gating means responsive to conditioning signals representative of a particular binary state only and which when conditioned assumes a logical condition indicative thereof, said gating means further comprising recirculation means operatively connected therewith, said recirculation means being selectively conditioned to maintain an associated stage in said predetermined logical condition, input means coupled to the respective stages of said plurality of register banks and having signals applied thereto to selectively condition said stages to said predetermined logical condition, transfer means interconnecting corresponding stages of adjacent register banks, said input means and said transfer means being capable of independently establishing said predetermined logical condition in said respective stages, and control means coupled to said transfer means and said recirculation means whereby the contents of successive ones of said plurality of multi-stage register banks may be transferred out of said transfer device in an asynchronous manner.

4. In a data transfer apparatus the combination comprising a plurality of multi-stage register banks, each of said stages comprising gating means including input means, transfer means and recirculation means operatively connected therewith; said input means having connected as inputs thereto signals representing at least two selectively actuated sources, said signals being capable of collectively energizing the gating circuitry of its associated stage to an operative condition indicative of a predetermined binary state; said recirculation means having control signals selectively applied thereto to maintain its associated stage in said particular operative condition indicative of said predetermined binary state; said transfer means interconnecting corresponding stages of said plurality of multi-stage register banks, said transfer means having control signals selectively applied thereto to enable the transfer through its associated stage of a signal indicative of the operative state of another stage of another one of said plurality of multi-stage register banks; and control means for generating said control signals, said control means further comprising a multi-stage shift register having feedback means connected from the last stage to the first stage thereof to establish therein a condition of binary significance opposite to that of said last stage, means connected to each of said shift register stages for sampling the status thereof, said sampling means including a pair of AND gates, each of which is connected to be partially conditioned by one of the outputs from said shift register stage, means connecting output signals generated in the gating circuitry of the last stage of said multi-stage shift register as input signals to complete the conditioning of each of said AND gates, and means connecting the output of said control means as inputs to said transfer means and said recirculation means associated with said plurality of multi-stage register banks whereby signals representative of the operative status of the respective stages of any particular register bank may be transferred essentially simultaneously to the output portion of said transfer apparatus.

5. A control apparatus comprising a multi-stage shift register, each stage of which is capable of assuming one or the other of two bistable states in accordance with the nature of a signal advanced thereto from the immediately preceding stage, feedback means connected from the last stage to the first stage of said shift register whereby an output signal from the last stage indicative of a particular one of said two bistable states is forwarded as an input to the first stage of said shift register to establish therein a condition representative of said other bistable state, sampling means connected to each of said shift register stages for representing the status thereof, said sampling means including a pair of AND gates, each of which is connected to be partially conditioned by one of the outputs from its associated shift register stage, further gating means operatively connected to the output of the last stage of said shift register, means connecting the output signals generated in said further gating means associated with the last stage of said shift register as conditioning signals to said pair of AND gates, said latter circuitry being further effective in resetting said control apparatus by effecting the removal of the conditioning signal to one of said pair of AND gates associated with each of said shift register stages.

6. A digital data transfer apparatus comprising a plurality of multi-stage register banks, input means connected to each of said stages, each of said input means having signals selectively applied thereto to condition its associated stage to an operative condition indicative of a predetermined binary state, recirculation means connected as part of each stage, said recirculation means having control signals selectively applied thereto to maintain the associated stage in said particular operative condition, transfer means interconnecting corresponding stages of adjacent register banks, said transfer means having control signals selectively applied thereto so as to enable the transfer through its associated stage of a signal indicative of the operative condition of a corresponding stage in another register bank, and control means connected to said transfer means and said recirculation means, said control means operative to selectively enable and disenable said transfer means and said recirculation means whereby the contents of successive register banks will be transferred during successive transfer cycles.

7. In an information transfer apparatus the combination comprising at least first, second, third and fourth multi-stage register banks; each of said stages comprising means responsive to a signal representing a particular binary state, which stage when so conditioned assumes a particular operative condition indicative thereof; each of said stages further having information input means, recirculation means, and transfer means operatively connected therewith; selected ones of said information input means associated with said plurality of register banks having signals applied therto to thereby activate said selected stages to said particular operative condition; control means connected to said recirculation means and said transfer means associated with each of said stages, said control means enabling said recirculation means associated with said third and fourth register banks and disenabling said recirculation means associated with said first and second register banks, said control means further enabling said transfer means interconnecting said first and second register banks and said second and third register banks and for disenabling said transfer means interconnecting said third and fourth register banks whereby the information signals stored in said selective stages of said third register banks will be transferred essentially simultaneously through corresponding stages of said first and second register banks to the output of said transfer apparatus.

8. In an information transfer apparatus the combination comprising at least first, second and third multi-stage register banks; each stage of said register banks comprising means responsive to a signal representing a particular binary state, which stage when so conditioned assumes a particular operative condition indicative thereof; each of said stages further having first and second transfer means interconnecting respectively said first and second register banks and said second and third register banks, said transfer means being selectively conditioned to enable the transfer therethrough of signals indicative of said particular binary state; first, second and third recirculation means connected respectively to said first, second and third register banks, said recirculation means being selectively enabled to maintain the associated stage in said particular operative condition; and control means connected to said recirculation means and said transfer means associated with all stages of said plurality of register banks, said control means enabling said recirculation means associated with said first register bank and disenabling said recirculation means associated with said second and third register banks, said control means further generating signals to enable said transfer means interconnecting said third and second and said second and first register banks whereby information signals upon arrival at said third register bank will be stored essentially simultaneously in selective locations of said first register bank.

9. A word to character data transfer apparatus comprising a plurality of multi-stage register banks, information input means connected to said plurality of multi-stage register banks and adapted to selectively apply to the individual stages thereof word oriented information signals indicative of a particular binary state, a bistable device operatively connected to said information input means, said bistable device adapted to be placed in a particular one of its bistable states in response to a signal indicating the completion of the transfer into said plurality of multi-stage register banks of said word oriented input information signals, recirculation means connected to each of said stages, said recirculation means being selectively conditioned to maintain its associated stage in said particular binary state, transfer means interconnecting corresponding stages of said plurality of multi-stage register banks, said transfer means having control signals selectively applied thereto to thereby enable the transfer through its associated stage of a signal indicative of the operative condition of a corresponding stage in another register bank, and control means operatively connected to said transfer means and said recirculation means, said control means further connected to a character receptive device and responsive to demands generated therein to enable and disenable respectively said transfer and recirculation means associated with successive register banks whereby the contents of successive ones of said plurality of multi-stage register banks will be transferred to said character receptive device upon the occurrence of successive demands generated therein, said bistable device further having reset means operatively connected to the last one of said multi-stage register banks whereby the transfer of said information signals therefrom will automaticaly cause said bistable device to be reset to the other one of its bistable states.

References Cited

UNITED STATES PATENTS

| | | | |
|---|---|---|---|
| 2,997,704 | 8/1961 | Gordon et al. | 340—347 |
| 3,160,857 | 12/1964 | Frush | 340—172.5 |
| 3,117,307 | 1/1964 | Davie | 340—172.5 X |
| 3,199,099 | 8/1965 | Nassimbene | 340—347 |

ROBERT C. BAILEY, *Primary Examiner.*

P. R. WOODS, *Assistant Examiner.*